2,823,199
Patented Feb. 11, 1958

United States Patent Office

2,823,199

COPOLYMERS OF ACRYLONITRILE AND 4,4-DICHLOROHEXAFLUOROBUTENE-1 AND METHOD FOR PREPARING SAME

Elizabeth S. Lo, Elizabeth, N. J., assignor to The M. W. Kellogg Company, Jersey City, N. J., a corporation of Delaware No Drawing. Application February 20, 1956
Serial No. 566,370

7 Claims. (Cl. 260—85.5)

This invention relates to, and has for its object, the preparation of new and useful polymers of 4,4-dichlorohexafluorobutene-1. More particularly, the invention relates to, and has for its object, the preparation of thermoplastic copolymers of 4,4-dichlorohexafluorobutene-1 having a wide variety of commercial uses and applications. Still more particularly, the invention relates to, and has for its object, a method for the preparation of these polymers. Other objects and advantages inherent in the invention will become apparent to those skilled in the art from the accompanying description and disclosure.

The monomer 4,4-dichlorohexafluorobutene-1, from which the polymers of the present invention are produced, is prepared as follows:

Trifluorochloroethylene is telomerized in the presence of sulfuryl chloride, employing benzoyl peroxide as a promoter, at a temperature of approximately 95° C. for a period of 4 hours, to produce the telomer dimer product, $Cl-(CF_2-CFCl)_2-Cl$, 1,2,4,4-tetrachlorohexafluorobutane, having a boiling point of 134° C. and an index of refraction ($n_D^{20}$) of 1.3820. To a 5 ml. round-bottom flask equipped with a magnetic stirrer, a dropping funnel, and a Friedrich condenser (which, in turn, is attached to a bubbler and cold trap maintained at a temperature of −68° C.) there is charged 357 grams (1.17 mol) of the aforementioned 1,2,4,4-tetrachlorohexafluorobutane. The contents of the flask are then heated to 130° C. Thereafter, 105.5 grams (0.63 mol) of triethyl phosphite are added dropwise over a period of 3 hours. The heating is continued for an additional period of 1 hour, after which time the generation of gas has ceased. The cold trap is found to contain only liquefied ethyl chloride (25.6 grams).

The Friedrich condenser, fitted to the reaction flask, is then replaced with a Vigreux distillation column, and the reaction product is distilled. A fraction (52.8 grams) boiling between about 60° C. and about 80° C., is collected. This fraction is then further purified by redistillation to yield a fraction having a boiling point of 67°–68° C., an index of refraction ($n_D^{20}$) of 1.3424 and a density ($D_4^{20}$) of 1.6192. The molar refractivity of this product is found to be 30.25. The calculated molar refractivity for $C_4F_6Cl_2$ is 30.22. Infrared analysis of this product shows an absorption band at 5.57 microns, indicative of the $CF_2=CF$-group. The product thus obtained is identified as 4,4-dichlorohexafluorobutene-1.

In a preferred embodiment of the present invention, 4,4-dichlorohexafluorobutene-1 is copolymerized with acrylonitrile to produce new and useful polymeric compositions. In this respect, it is found that these polymeric compositions show increased tensile strength, increased resistance to oil and hydrocarbon fuels, improved flow-properties and improved chemical and physical stability over polymers of acrylonitrile, alone. These polymeric products of 4,4-dichlorohexafluorobutene-1 and acrylonitrile, constitute valuable macromolecules and are adaptable to a wide variety of commercial uses. They possess low-temperature flexibility, in addition to the aforementioned properties of chemical and physical stability and resistance to oil and hydrocarbon fuels. They are also selectively soluble in various commercial solvents, and serve as durable, flexible, protective coatings on surfaces which are subjected to environmental conditions in which they may come into contact with a wide variety of corrosive substances, such as oils, fuels and strong chemical reagents.

In general, as more fully hereinafter disclosed, the polymeric compositions of the present invention are produced from the polymers of monomeric mixtures containing 4,4-dichlorohexafluorobutene-1 and acrylonitrile at temperatures between about −25° C. and about 150° C., with intermediate temperature ranges being selected with reference to the specific catalyst system employed. The most useful polymeric compositions of the present invention are copolymers produced from monomeric mixtures containing between about 50 mole percent and about 75 mole percent 4,4-dichlorohexafluorobutene-1 and the remaining major constituent being acrylonitrile in a corresponding amount between about 25 mole percent and about 50 mole percent. In producing polymeric compositions from the aforementioned monomeric mixtures containing between about 50 mole percent and about 75 mole percent 4,4-dichlorohexafluorobutene-1 and correspondingly between about 25 mole percent and about 50 mole percent acrylonitrile, it is found that the finished copolymeric product contains between about 5 mole percent and about 25 mole percent 4,4-dichlorohexafluorobutene-1 and correspondingly between about 75 mole percent and about 95 mole percent acrylonitrile, due to the differences in respective monomeric reactivity ratios.

The polymeric compositions of the present invention are preferably prepared by carrying out the polymerization reaction in the presence of a free radical-forming promoter. For this purpose, the polymerization reaction is carried out by employing a water-soluble peroxy type initiator in a water-suspension type recipe or an organic peroxide initiator in a bulk-type system. The water-suspension type recipe is preferred.

The water-suspension type system contains a water-soluble peroxy type initiator, which is preferably present in the form of an inorganic persulfate such as potassium persulfate, sodium persulfate or ammonium persulfate. In addition, the water-suspension type recipe system may also contain, in some instances, a variable-valence metal salt, for example, an iron salt such as ferrous sulfate or ferrous nitrate to accelerate the polymerization reaction. The water-soluble initiator present in the water-suspension type recipe system comprises between about 0.1 and about 5 parts by weight per 100 parts of total monomers present. The variable-valence metal salt is preferably employed in an amount between about 0.01 and about 0.2 part by weight per 100 parts of total monomers present. It is also desirable, in some instances, in these water-suspension type recipe systems, that a reductant be present, preferably in the form of a bisulfite, such as sodium bisulfite, potassium bisulfite, sodium metabisulfite or potassium metabisulfite. The reductant comprises between about 0.05 and about 5 parts by weight per 100 parts of total monomers present; preferably the reductant comprises between about 0.1 and about 2 parts by weight per 100 parts of total monomers present.

In these water-suspension type recipe systems, it is desirable to employ an emulsifying agent. This emulsifying agent is present either in the form of an aliphatic metal acid-salt having from 14 to 20 carbon atoms per molecule, or in the form of a halogenated-organic acid or salts thereof, having from 6 to 18 carbon atoms per molecule. A typical example of the former is potassium stearate. Typical examples of the halogenated-organic acids or salts thereof, serving as emulsifying agents in the above-mentioned water-suspension type recipe systems are polyfluorocarboxylic acids (e. g., perfluorooctanoic acid) or perfluorochlorocarboxylic acid salts (e. g., trifluorochloroethylene telomer acid soaps). The polyfluorocarboxylic acids which may be employed are such as those disclosed in U. S. Patent No. 2,559,752; and the non-acidic derivatives of the acids disclosed therein as being effective dispersing agents may also be used in the process of the present invention. The perfluorochlorocarboxylic acid salts which may be used in accordance with this invention are those disclosed in co-pending application Serial No. 501,782, filed April 18, 1955, as being useful dispersing agents in polymerization reactions. In general, these emulsifying agents are present in an amount between about 0.5 and about 10 parts by weight per 100 parts of total monomers present.

It is desirable, in carrying out the polymerization reaction, that a pH be maintained between about 3 and 9 in order to prevent gelling of the resulting polymeric product, a condition which often causes slow-down or stoppage of the polymerization reaction. Preferably, the polymerization reaction is conducted under neutral or acidic conditions. In this respect, it should be noted that it is sometimes necessary to maintain the pH of the system within the aforementioned pH limits by the addition of suitable buffer agents. Typical examples are sodium borate and disodium phosphate.

As indicated above, the polymerization reaction may also be carried out with the initiator being present in the form of an organic peroxide in a bulk-type polymerization system. Of these organic peroxide promoters, halogen-substituted peroxides are most desirable. A preferred promoter of this type is trichloroacetyl peroxide. Other halogen-substituted organic peroxides for carrying out the polymerization reaction are trifluorodichloropropionyl peroxide, trifluoroacetyl peroxide, difluoroacetyl peroxide, chloroacetyl peroxide, 2,4-dichlorobenzoyl peroxide and dichlorofluoroacetyl peroxide.

As previously indicated, the polymerization reaction is carried out, in general, at a temperature between about $-25°$ C. and about $150°$ C. When the polymerization reaction is carried out employing a water-suspension type recipe, temperatures between about $5°$ C. and about $100°$ C. are preferably employed. When the polymerization reaction is carried out in the presence of an organic peroxide initiator in a bulk-type polymerization system, temperatures between about $-25°$ C. and about $75°$ C. are preferably employed. The polymerization reactions described herein to produce the polymeric compositions of the present invention are carried out under autogenous conditions of pressure. These pressures may vary from about atmospheric pressure to as high as 2000 pounds per square inch. However, in general, these pressures do not rise above approximately 500 pounds per square inch.

As previously indicated, the polymeric compositions of the present invention are particularly suitable and useful when employed in the form of durable, flexible coatings on a wide variety of surfaces which are subjected to distortion in normal use, such as fabric surfaces. For this purpose, the polymeric composition may be dissolved in various commercial solvents. Particularly useful solvents comprise the aliphatic and aromatic esters, ketones and halogenated hydrocarbons. Typical examples of these solvents are di-isobutyl ketone, methyl ethyl ketone, methyl isobutyl ketone, ethyl acetate and 1,1,2-trifluorotrichloroethane. In this respect, it should be noted that it is often desirable to regulate the molecular weight of the polymeric compositions of the present invention in order to obtain greater solubility in organic solvents. It is found that the addition of various polymerization modifiers appreciably reduces the molecular weight of the polymeric compositions and increases their solubility without affecting unduly the overall yield. Suitable polymerization modifiers include chloroform ($CHCl_3$), Freon-113 ($CF_2ClCFCl_2$), carbon tetrachloride ($CCl_4$), trichloroacetyl chloride ($CCl_3COCl$), bromotrichloromethane ($CBrCl_3$), dodecyl mercaptan ($C_{12}H_{25}SH$) and mixed tertiary mercaptans. These modifiers are preferably added in amounts between about 0.01 and about 10 parts by weight per 100 parts of total monomers charged to the polymerization reaction. Chloroform is preferred.

The following example is offered for a better understanding in producing the polymeric compositions of the present invention, and is not to be construed as limiting its scope.

Example

A heavy-walled glass polymerization tube of about 20 ml. capacity was flushed with nitrogen and then charged with 1 ml. of a solution of 0.4 gram of sodium bisulfite dissolved in 20 ml. of water. The contents of the tube were then frozen, and the tube was then charged with 5 ml. of a solution containing 0.75 gram of perfluorooctanoic acid dissolved in 100 ml. of water. This latter solution, before being charged to the polymerization tube, was adjusted to a pH of 12 by the addition of aqueous potassium hydroxide. The contents of the tube were next refrozen in liquid nitrogen. The tube was then charged with 4 ml. of a solution of 1 gram of potassium persulfate dissolved in 80 ml. of water. The resulting mixture was found to have a pH of 7. The contents of the tube were then refrozen in liquid nitrogen.

The tube was next connected to a gas-transfer system and evacuated at liquid nitrogen temperature. To the frozen contents of the tube were added, by distillation, 4.1 grams of 4,4-dichlorohexafluorobutene-1 and 0.9 gram of acrylonitrile, which comprised a 50/50 molar ratio.

The polymerization tube was then sealed and rotated end-over-end in a temperature-regulated water-bath at $50°$ C. for a period of 16 hours. At the end of this time, the contents of the tube were coagulated by freezing at liquid nitrogen temperature. The coagulated product was then removed from the tube, washed with hot water and then dried to constant weight in vacuo at $35°$ C. A copolymeric product was obtained which was found, upon analysis, to comprise approximately 7.5 mole percent 4,4-dichlorohexafluorobutene-1 and the remaining major constituent, acrylonitrile, being present in an amount of approximately 92.5 mole percent. The copolymer was obtained in an amount corresponding to a 16% conversion.

As previously indicated, the polymeric compositions of the present invention possess highly desirable physical and chemical properties which make them useful for fabrication of a wide variety of thermoplastic articles, or for application to various surfaces as protective coatings. In such uses, a raw elastomeric copolymer, such as is produced in accordance with the procedure set forth in the above example, is extruded or pressed into sheets at temperatures between about $200°$ F. and about $650°$ F., and at a pressure between about 500 and about 15,000 pounds per square inch for a period of about 10 to about 60 minutes. Thereafter, various articles can be molded from preforms cut from sheets and extruded stock in the form of gaskets, diaphragms, packings, etc. In this respect, it is preferred, in such applications, that the raw copolymer also include various vulcanizing agents and fillers.

When employed as protective coatings on any of the surfaces previously described, the raw copolymeric composition is dissolved in any of the aforementioned solvents and is applied to the desired surfaces, employing such apparatus as a knife-spreader, or a doctor-blade or a reverse-roll coater. The solvent, after the copolymeric coating composition has been applied to the surface, is permitted to evaporate. This may also be accomplished in the presence of elevated temperatures, if so desired.

In many applications, it is desirable to include in the copolymeric coating composition, various vulcanizing agents. In the latter case, supplementary heat-treatment of the coating is required, either during the solvent-removal step or thereafter. After the solvent has been completely removed, and after the vulcanizing step, if included, has been completed, the coated surface is ready for use. In this respect, it should be noted that the polymeric coating composition may be applied to the surface either as a single coating or, if so desired, the protective coating may be built-up by the application of several layers, each layer being permitted to harden by solvent evaporation before the next layer is applied. Furthermore, if so desired, the protective coatings, or the polymeric composition when obtained in the form of sheets, may be suitably pigmented. Other uses for the polymeric compositions of the present invention reside in the fabrication of pressure-sensitive tape for electrical insulation purposes, or as adhesives for fastening a rubber surface to a metal or another rubber surface.

Since certain changes may be made in carrying out the process of the present invention in producing the desired polymeric compositions without departing from the scope of the invention, it is intended that all matter contained in the above description is to be interpreted as illustrative and not in a limiting sense.

I claim:

1. A process for preparing a polymeric composition which comprises polymerizing a monomeric mixture of 4,4-dichlorohexafluorobutene-1 and acrylonitrile, said mixture containing between about 50 mole percent and about 75 mole percent 4,4-dichlorohexafluorobutene-1 and correspondingly between about 50 mole percent and about 25 mole percent acrylonitrile, at a temperature between about −25° C. and about 150° C.

2. A process for preparing a polymeric composition which comprises polymerizing a monomeric mixture of 4,4-dichlorohexafluorobutene-1 and acrylonitrile, said mixture containing between about 50 mole percent and about 75 mole percent 4,4-dichlorohexafluorobutene-1 and correspondingly between about 50 mole percent and about 25 mole percent acrylonitrile, in the presence of a polymerization promoter comprising a peroxy compound at a temperature between about −25° C. and about 150° C.

3. A process for preparing a polymeric composition which comprises polymerizing a monomeric mixture of 4,4-dichlorohexafluorobutene-1 and acrylonitrile, said mixture containing between about 50 mole percent and about 75 mole percent 4,4-dichloro-hexafluorobutene-1 and correspondingly between about 50 mole percent and about 25 mole percent acrylonitrile, in the presence of a polymerization promoter comprising an inorganic peroxy compound at a temperature between about 5° C. and about 100° C.

4. A process for preparing a polymeric composition which comprises polymerizing a monomeric mixture of 4,4-dichlorohexafluorobutene-1 and acrylonitrile, said mixture containing between about 50 mole percent and about 75 mole percent 4,4-dichlorohexafluorobutene-1 and correspondingly between about 50 mole percent and about 25 mole percent acrylonitrile, in the presence of a polymerization promoter comprising an organic peroxy compound at a temperature between about −25° C. and about 75° C.

5. A copolymer of about 5 mole percent to about 25 mole percent 4,4-dichlorohexafluorobutene-1 and correspondingly about 95 mole percent about 75 mole percent acrylonitrile.

6. A process for preparing a polymeric composition which comprises polymerizing a monomeric mixture of 4,4-dichlorohexafluorobutene-1 and acrylonitrile, said mixture containing between about 50 mole percent and about 75 mole percent 4,4-dichlorohexafluorobutene-1 and correspondingly between about 50 mole percent and about 25 mole percent acrylonitrile, at a temperature between about 5° C. and about 100° C.

7. A process for preparing a polymeric composition which comprises polymerizing a monomeric mixture of 4,4-dichlorohexafluorobutene-1 and acrylonitrile, said mixture containing between about 50 mole percent and about 75 mole percent 4,4-dichlorohexafluorobutene-1 and correspondingly between about 50 mole percent and about 25 mole percent acrylonitrile, at a temperature between about −25° C. and about 75° C.

References Cited in the file of this patent

UNITED STATES PATENTS 2,549,580   Denison et al. _____ Apr. 17, 1951

FOREIGN PATENTS 494,441   Canada _____ July 14, 1953

OTHER REFERENCES

Journal of Polymer Science, vol. IX, December 1952, pages 481–492.

UNITED STATES PATENT OFFICE

CERTIFICATE OF CORRECTION

Patent No. 2,823,199                                              February 11, 1958

Elizabeth S. Lo

It is hereby certified that error appears in the printed specification of the above numbered patent requiring correction and that the said Letters Patent should read as corrected below.

Column 6, line 20, claim 5, after the word "percent", first occurrence, insert -- to --.

Signed and sealed this 22nd day of July 1958.

(SEAL)
Attest:

KARL H. AXLINE
Attesting Officer

ROBERT C. WATSON
Commissioner of Patents